US012386314B2

(12) United States Patent
Besutti et al.

(10) Patent No.: US 12,386,314 B2
(45) Date of Patent: *Aug. 12, 2025

(54) MONOCRISTALLINE TYPE MINERAL STONE EQUIPPED WITH A CONE FOR CENTRING A PIVOT, AND MANUFACTURING METHOD THEREOF

(71) Applicant: Comadur SA, Le Locle (CH)

(72) Inventors: Bruno Besutti, Charquemont (FR); Sébastien Retrouvey, Chissey sur Loue (FR); Pierry Vuille, Les Emibois (CH)

(73) Assignee: Comadur SA, Le Locle (CH)

( * ) Notice: Subject to any disclaimer, the term of this patent is extended or adjusted under 35 U.S.C. 154(b) by 700 days.

This patent is subject to a terminal disclaimer.

(21) Appl. No.: 17/629,209

(22) PCT Filed: Jun. 26, 2020

(86) PCT No.: PCT/EP2020/068148
§ 371 (c)(1),
(2) Date: Jan. 21, 2022

(87) PCT Pub. No.: WO2021/018491
PCT Pub. Date: Feb. 4, 2021

(65) Prior Publication Data
US 2022/0236693 A1 Jul. 28, 2022

(30) Foreign Application Priority Data

Jul. 26, 2019 (EP) ..................................... 19188642

(51) Int. Cl.
*B23K 26/382* (2014.01)
*B23K 26/0622* (2014.01)
(Continued)

(52) U.S. Cl.
CPC .......... *G04B 31/06* (2013.01); *B23K 26/0624* (2015.10); *B23K 26/082* (2015.10);
(Continued)

(58) Field of Classification Search
CPC ............. B23K 26/0624; B23K 26/082; B23K 26/382; B23K 26/384; B23K 26/388;
(Continued)

(56) References Cited

U.S. PATENT DOCUMENTS 1,004,505 A * 9/1911 Verneuil ................. C30B 29/26
501/86
4,992,025 A 2/1991 Stroud et al.
(Continued)

FOREIGN PATENT DOCUMENTS

CN 1849194 A 10/2006
CN 101157191 A 4/2008
(Continued)

OTHER PUBLICATIONS

Translation of CN 104759759 A (published on Jul. 8, 2015).*
(Continued)

*Primary Examiner* — Leo B Tentoni
(74) *Attorney, Agent, or Firm* — Oblon, McClelland, Maier & Neustadt, L.L.P.

(57) ABSTRACT

A method for manufacturing a stone for a timepiece from a mineral body of a monocrystalline type, the stone including a hole, includes ablating the body by scanning at least one face of the body with ultra-short pulse laser radiation from a laser for a duration less than one hundred picoseconds, and guiding a beam of the laser radiation using a precession system of at least three axes configured to at least partially cancel a conical focusing angle of the laser. The ablating includes digging of a cone of entrance to the hole. A mineral stone of monocrystalline type for a timepiece includes a face
(Continued)

provided with a hole formed in a body of the stone, and a functional element at an entrance to the hole. The functional element has a shape of a cone.

15 Claims, 1 Drawing Sheet

(51) Int. Cl.
| | |
|---|---|
| B23K 26/082 | (2014.01) |
| B23K 26/384 | (2014.01) |
| B23K 26/388 | (2014.01) |
| B23K 26/402 | (2014.01) |
| B28D 5/04 | (2006.01) |
| G04B 31/004 | (2006.01) |
| G04B 31/02 | (2006.01) |
| G04B 31/06 | (2006.01) |
| B23K 103/00 | (2006.01) |
| G04D 3/00 | (2006.01) |

(52) U.S. Cl.
CPC .......... *B23K 26/384* (2015.10); *B23K 26/402* (2013.01); *G04B 31/004* (2013.01); *G04B 31/02* (2013.01); *B23K 2103/50* (2018.08); *B23K 2103/52* (2018.08); *G04D 3/0071* (2013.01)

(58) Field of Classification Search
CPC .... B23K 26/402; B23K 2103/50; B28D 5/04; G04B 31/004; G04B 31/06; G04D 3/0071
USPC ............. 264/162, 400; 125/30.01; 219/121.7
See application file for complete search history.

(56) References Cited

U.S. PATENT DOCUMENTS

| | | |
|---|---|---|
| 5,043,553 A | 8/1991 | Corfe et al. |
| 5,096,379 A | 3/1992 | Stroud et al. |
| 2002/0135108 A1 | 9/2002 | Billiet et al. |
| 2013/0175243 A1 | 7/2013 | Wang |
| 2015/0121960 A1* | 5/2015 | Hosseini ............ B23K 26/0624 125/30.01 X |
| 2017/0351215 A1* | 12/2017 | Fukuda .................. G04B 1/165 |
| 2020/0326656 A1* | 10/2020 | Cunto .................... G04B 31/06 |

FOREIGN PATENT DOCUMENTS

| | | |
|---|---|---|
| CN | 102711382 A | 10/2012 |
| CN | 103143841 A | 6/2013 |
| CN | 104759759 A | 7/2015 |
| CN | 104759764 A | 7/2015 |
| EP | 3 367 182 A1 | 8/2018 |
| WO | WO 2017/029210 A1 | 2/2017 |

OTHER PUBLICATIONS

Translation of EP 3367182 A1 (published on Aug. 29, 2018).*
Office Action issued Sep. 12, 2023, in corresponding Japanese Patent Application No. 2022-503929 (with English Translation), 5 pages.
Combined Chinese Office Action and Search Report issued Oct. 12, 2023, in corresponding Chinese Patent Application No. 202080054354.8 (with English Translation and English Translation of Category of Cited Documents), 15 pages.
Office Action issued Jul. 1, 2024, in corresponding Korean Patent Application No. 10-2022-7001387 (with English Translation), 7 pages.
Office Action issued Mar. 18, 2024, in corresponding Korean Patent Application No. 10-2022-7001387 (with English Translation), 15 pages.
International Search Report mailed on Aug. 24, 2020 in PCT/EP2020/068148 filed on Jun. 26, 2020 (3 pages).
Kemnitzer et al., "Next-Generation of High-Power, sub-300 fs Lasers with >100 W for Industrial Applications", 2017 Conference on Lasers and Electro-Optics Europe & European Quantum Electronics Conference (CLEO/Europe-EQEC), IEEE, XP033239695, Jun. 25, 2017, p. 1.
Sapora, "Laser Drilling", Retrieved from the Internet: http://www.createch.ch/en/competences/laser-drilling, XP055722337, Aug. 13, 2020, 2 total pages.
Chinese Office Action issued May 23, 2024 in corresponding Chinese Patent Application No. 202080054354.8 (with English translation), 14 pages.

* cited by examiner

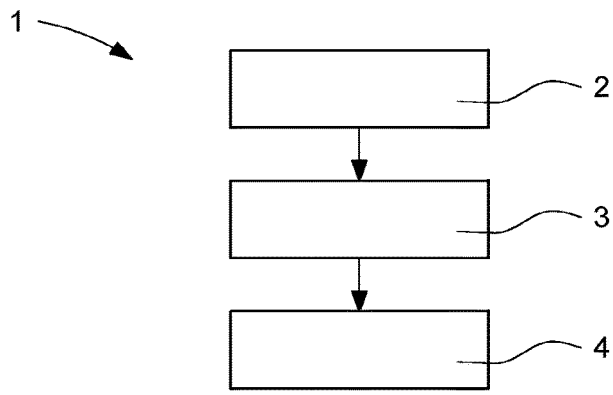
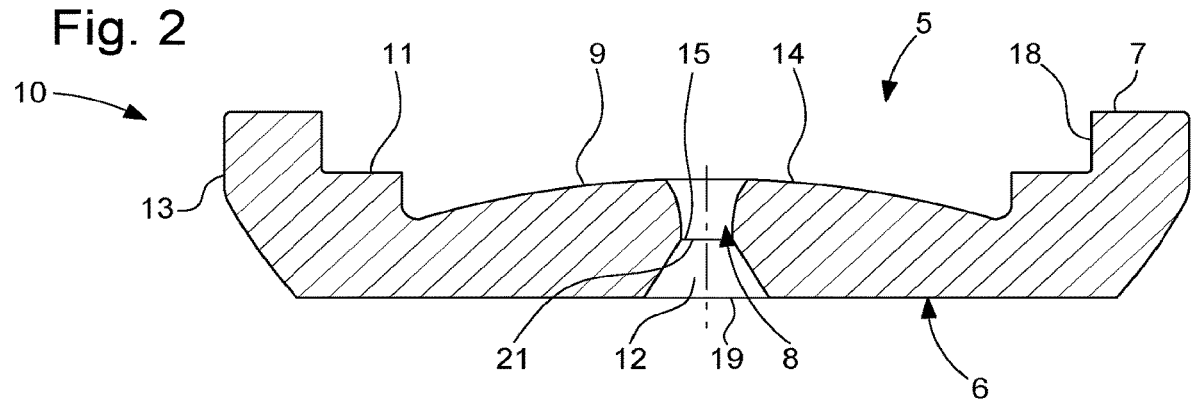
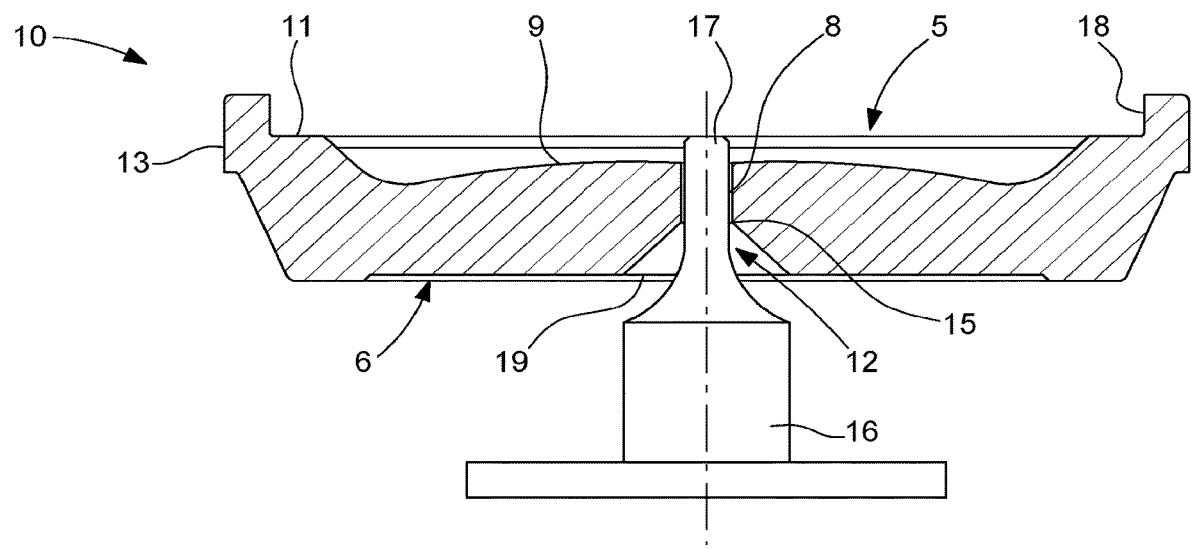

MONOCRISTALLINE TYPE MINERAL STONE EQUIPPED WITH A CONE FOR CENTRING A PIVOT, AND MANUFACTURING METHOD THEREOF

FIELD OF THE INVENTION

The invention relates to a drilled stone provided with a cone for centring a pivot, in particular for a horological movement The invention also relates to a method for manufacturing such a drilled stone.

The invention also relates to a horological movement comprising such a drilled stone.

BACKGROUND OF THE INVENTION

In the prior art of watchmaking, stones of the ruby or sapphire type are used in particular to form counter-pivots or guide elements, called bearings. These counter-pivots and guide elements are intended to contact the pivots in order to make the latter movable in rotation with minimal friction. Thus, they form, for example, all or part of a bearing-block of an axis mounted in rotation.

In principle, synthetic stones are used in horological movements. In particular, the Verneuil-type method is known for manufacturing stones of the monocrystalline type. There are also stones of the poly-crystalline type, which are made by pressing a precursor in order to obtain a green body of the new stone from a pressing tool. The stones are then machined to obtain a finished shape with the desired dimensions.

Stones serving as a rotational guide element for a pivot generally have a through hole wherein the pivot is inserted to rest on a counter-pivot.

It is known to form a substantially hemispherical recess around the hole on the insertion face of the pivot to facilitate insertion of the pivot. Furthermore, it allows the pivot to be put back in place in the event that the latter comes out due to an impact. The recess is, for example, obtained by turning with a diamond chisel.

However, the recess, obtained with such a method, has a protruding rim at the edge of the hole, so that the pivot can be damaged by said rim, and vice versa, for example under the effect of an impact, if the pivot comes out of the hole and enters again.

To avoid this, it is known to replace the recess with a cone whose angle is smaller, so that the rim is less protruding. This prevents wear on the pivot in particular.

Regarding polycrystalline stone guide elements, the pressing tool is for example provided with a cone shape and a wire participating in the construction of a hole blank provided with a cone at its entrance.

Monocrystalline type stones are first drilled with a laser to obtain the blank of the hole. The final dimension of the hole is subsequently obtained by machining a diamond chisel. However, it is not known how to make a cone in a stone of the monocrystalline type, because conventional machining does not allow such a shape to be obtained.

SUMMARY OF THE INVENTION

The purpose of the present invention is to alleviate all or part of the disadvantages mentioned above, by proposing a method for manufacturing a stone, in particular for a timepiece, from a mineral body of the monocrystalline type, the stone comprising a hole.

To this end, the method is remarkable in that it comprises an ablation step wherein the body is subjected to ablation of material by scanning at least one face of the body with ultra-short pulse laser radiation the duration of which is less than one hundred picoseconds, and the beam of which is guided by a precession system of at least three axes configured to at least partially cancel the conical focusing angle of said laser, the laser ablation step comprising the digging of a cone of entrance to the through-hole.

Thanks to this method, it is possible to remove material from the stone extremely precisely, and thus to obtain shapes and surfaces impossible to form with laser methods known in the prior art. Such a device allows the laser beam to be focused with great precision, while at least partially canceling the conical angle formed by the laser beam, and which is due to the focusing of said laser. Indeed, the focusing generates a laser in the shape of a cone, which does not allow to have an identical beam diameter over the entire height at the location point of the laser, so that the ablation of material is not. The system allows to cancel the angle of the cone on at least one side of the beam, which in particular allows to obtain straight cuts. These straight cuts cannot be obtained with conventional cutting lasers.

Thus, it is possible to obtain a cone of entrance to the hole in a monocrystalline type body, which was not possible with other systems. In particular, such a cone is useful for a pivot of a non-magnetic axis, which is softer. Indeed, the combination of such an axis with a stone of the monocrystalline type is deformable under the effect of an impact, so that it is absorbed by the axis.

In addition, the ultra-short pulses of the laser prevent thermal heating of the stone, which adversely affects the quality of the stone.

Furthermore, the surface condition Ra of the stone obtained with the method according to the invention is of the order of 0.1, which then allows to polish the stone with conventional means of polishing. Thus, this method provides significant advantages while keeping an implementation without great complexity.

According to a particular embodiment of the invention, the cone obtained during the ablation step has an angle comprised within an interval ranging from 30° to 120°, preferably from 45° to 90°.

According to a particular embodiment of the invention, the ablation is carried out layer by layer, each layer having a thickness comprised within an interval ranging from 1 to 10 µm, preferably from 2 to 4 µm.

According to a particular embodiment of the invention, the pulses have a duration comprised within an interval ranging from 50 to 400 fs, preferably within an interval ranging from 250 to 300 fs or from 80 to 100 fs.

According to a particular embodiment of the invention, the laser has a wavelength comprised within an interval ranging from 400 to 600 nm, preferably between 450 and 550 nm, or even 500 nm.

According to a particular embodiment of the invention, the mineral body comprises $AL_2O_3$.

According to a particular embodiment of the invention, the method comprises a preliminary step of manufacturing the body by a Verneuil-type method.

According to a particular embodiment of the invention, the method comprises an additional finishing step, for example lapping and/or brushing and/or polishing of the mineral body after the laser step, in particular on the ablation areas.

According to a particular embodiment of the invention, the laser ablation step comprises digging the hole, the hole preferably being a through-hole between a lower face and an upper face of the stone.

The invention also relates to a mineral stone of monocrystalline type, in particular for a timepiece, said stone including a face provided with a hole formed in the body of the stone and a functional element at the entrance to the hole. The stone is remarkable in that the functional element has the shape of a cone.

According to a particular embodiment of the invention, the stone comprises an upper face and a lower face, the lower face including the cone.

According to a particular embodiment of the invention, the hole is a through-hole so as to connect said cone to the upper face of said stone.

According to a particular embodiment of the invention, said stone comprises $AL_2O_3$.

Finally, the invention also relates to a timepiece comprising such a stone, in particular for a damper bearing-block.

BRIEF DESCRIPTION OF THE DRAWINGS

Other features and advantages will emerge clearly from the description which is given below, in an indicative and non-limiting manner, with reference to the appended drawings, wherein:

FIG. 1 is a block diagram of the production of a stone according to the method of the invention;

FIG. 2 is a schematic representation of a stone obtained after the laser ablation step using the method according to the invention;

FIG. 3 is a schematic representation of an assembly comprising a stone of FIG. 2 and an axis provided with a pivot.

DETAILED DESCRIPTION OF THE PREFERRED EMBODIMENTS

As explained above, the invention relates to a method for manufacturing a stone capable of forming a guide element of a timepiece. The stone is for example intended to contact a pivot in order to make the latter movable in rotation with minimal friction. It is therefore understood that the present invention allows in particular to produce a stone which can form all or part of a bearing-block of an axis mounted in rotation.

The stone is formed from a mineral body of monocrystalline type. The body comprises, for example, $AL_2O_3$.

The method 1, shown in FIG. 1, comprises a first step 2 of manufacturing the crystalline mineral body by a Verneuil-type method, which is well known in the field of watchmaking. The material is formed from a powder melted by an oxyhydrogen torch at over 2000° C. The body crystallises after cooling below the melting point. The body is dimensioned so as to obtain dimensions close to those desired, in particular to facilitate its future machining. This step provides a monocrystalline one-piece body.

According to the invention, the method comprises a second laser ablation step 3 in order to form a cone of entrance to a hole in the stone. During the laser ablation step 3, the body is subjected to ablation of material by scanning on at least one side of the body with ultra-short pulse laser radiation the duration of which is less than one hundred picoseconds, and the beam of which is guided by a precession system of at least three axes configured to cancel the conical angle of the laser due to the focusing of said laser.

Such a device is for example described in document WO 2017029210. There are different types of devices allowing to cancel at least in part the conical angle of the laser. Some devices use a five or six axis precession system.

Thus, the laser beam has at least one substantially straight edge, so that these devices allow to dig the surface of the stone and give it a specific cone shape at the entrance to the hole of a monocrystalline mineral body. Thanks to this cone, if the pivot comes out of the hole due to an impact, the pivot returns to the hole without being damaged by the rim of the edge of the hole. Such a cone facilitates the insertion of a pivot into the hole, and avoids the risk of wear of the pivot in the event of an impact. As the rim of a cone protrudes less, the risk of wear is greatly reduced. For example, an angle comprised between 30° and 120°, preferably between 45° and 90°, is selected.

The ablation is done layer by layer, the laser scanning an area of the body to dig it. Each layer has, for example, a thickness comprised within an interval ranging from 1 to 10 μm, preferably from 2 to 4 μm. Material is removed layer by layer until the desired shape is obtained.

The laser has, for example, a wavelength comprised between 400 and 600 nm, preferably between 450 and 550 nm, or even of the order of 500 nm. The duration of the pulsation is less than the picosecond, for example comprised within an interval ranging from 50 to 400 fs, preferably within an interval ranging from 250 to 300 fs or from 80 to 100 fs. Such features allow to dig the body without adversely affecting the properties of the material forming the stone.

It is also possible to dig the hole in the stone. This step of the method allows the hole to be drilled directly to the correct dimension, without having to go through a blank, then a machining step so that the hole has exact and homogeneous dimensions over the entire height of the hole.

Finally, a third finishing step 4 allows to give the stone a surface state compatible with its use. It is sought for example to obtain a surface state Ra=0.05 μm. Such a finishing step can thus include a lapping and/or a brushing and/or a polishing allowing the adjustment of the final dimensions and/or the removal of rims and/or the local modification of the roughness.

As shown in FIGS. 2 and 3, the invention also relates to a stone 10, obtainable by the method described above, the stone forming for example a guide element intended to be mounted in a damper bearing-block of a timepiece. However, such a stone cannot be limited to the watchmaking field and can be applied to any element that is movably mounted relative to a bearing-block. The stone 10 includes the features described in the method above. In particular, it is formed from a monocrystalline mineral material, comprising for example $ALO_3$.

Advantageously, the stone 10 is traversed by a hole 8 intended to receive a pivot 17, also called a trunnion. The stone includes an upper face 5 and a lower face 6, one of which comprises a cone 12 communicating with the through-hole 8. In other words, the hole 8 communicates with the upper face 5 and also with a substantially conical hollow defined in the lower face 6. This hollow then forms an engagement cone of the stone 10. The cone 12 is preferably cylindrical. The cone 12 has a first opening 19 at its base and a second opening 21 at its top. The first opening 19 is larger than the second opening 21, and is formed in the lower face 6 of the stone 10. The connection of the cone 12 and the hole 8 takes place through the second opening 21 to form a rim 15.

Thus, the flaring of the cone 12 allows to easily insert the pivot 17 of the axis 16 of a part movable in rotation, in particular in the event of an impact. The angle of the cone is selected to prevent the rim 15 formed by the top of the cone and the hole 8 from protruding too much. For example, an angle comprised between 30° and 120°, preferably between 45° and 90°, is selected.

It is also noted that an internal wall of the body of this stone 10 defined at the hole 8 includes a rounded area intended to minimise contact with the pivot but also to facilitate possible lubrication. It will be noted that minimising contact with the pivot allows in particular to reduce friction with the pivot.

The upper face 5 of the stone comprises a flange 7, in particular for laterally enclosing a counter-pivot in the case of a bearing-block. The flange 7 is preferably peripheral, that is to say that it delimits the edge of the upper face 5 of the stone 10. In addition, it defines an internal area 9 of the upper face 5 including a bearing face 11 and the outlet of the through-hole 8, and a concentrically convex area 14 from the bearing face 11 to the hole 8.

An upper face 5 with such a flange 7 allows for example to laterally block an element arranged on the upper face of the stone 10. In the case of a bearing-block for a balance axis, wherein the stone 10 serves as a guide element, a counter-pivot stone can be disposed in such a way that it is laterally blocked by the internal side 18 of the flange 7 while resting on the bearing face 11. The counter-pivot stone is dimensioned to correspond to the area 9 of the stone that has undergone laser ablation. The stone thus forms an axial and radial support for a counter-pivot. The counter-pivot, not shown in the figures, can be fitted into the stone 10 to support it axially and hold it laterally.

Furthermore, the stone 10 has a peripheral face 13 which is partly flared connecting the lower face 6 of smaller surface to the upper face 5 of larger surface.

Of course, the present invention is not limited to the example illustrated but is liable to numerous variations and modifications which will be apparent to the person skilled in the art. In particular, other types of functional elements formed by the laser ablation step can be advantageously considered according to the invention.

The invention claimed is:

1. A method for manufacturing a stone for a timepiece from a mineral body of a monocrystalline type, the stone comprising a hole, the method comprising:

ablating the body by scanning at least one face of the body with ultra-short pulse laser radiation from a laser for a duration less than one hundred picoseconds; and guiding a beam of the laser radiation using a precession system of at least three axes configured to at least partially cancel a conical focusing angle of the laser, wherein the ablating includes digging of a cone of entrance to the hole, and the ablating is carried out layer by layer, each layer having a thickness comprised within an interval ranging from 1 to 10 μm.

2. The method according to claim 1, wherein the thickness is within an interval ranging from 2 to 4 μm.

3. The method according to claim 1, wherein the cone obtained during the ablating has an angle comprised within an interval ranging from 30° to 120°.

4. The method according to claim 3, wherein the angle is within an interval ranging from 45° to 90°.

5. The method according to claim 1, wherein the laser irradiation comprises pulses having a duration comprised within an interval ranging from 50 to 400 fs.

6. The method according to claim 5, wherein the duration is within an interval ranging from 250 to 300 fs.

7. The method according to claim 5, wherein the duration is within an interval ranging from 80 to 100 fs.

8. The method according to claim 1, wherein the laser has a wavelength comprised within an interval ranging from 400 to 600 nm.

9. The method according to claim 8, wherein the wavelength is within an interval ranging between 450 and 550 nm.

10. The method according to claim 1, wherein the mineral body comprises $Al_2O_3$.

11. The method according to claim 1, further comprising manufacturing the body by a Verneuil-type method before the ablating.

12. The method according to claim 1, further comprising finishing at least areas of the mineral body which have been ablated.

13. The method according to claim 12, wherein the finishing comprises at least one of lapping, brushing, and polishing of the mineral body.

14. The method according to claim 1, wherein the ablating further comprises digging the hole.

15. The method according to claim 14, wherein the hole is a through-hole between a lower face and an upper face of the stone.

* * * * *